United States Patent
Mazak et al.

(10) Patent No.: US 10,558,985 B2
(45) Date of Patent: Feb. 11, 2020

(54) PATHING AND ATTRIBUTION IN MARKETING ANALYTICS

(71) Applicant: Impact Radius, Inc., Santa Barbara, CA (US)

(72) Inventors: Paul Mazak, Westerville, OH (US); Kevin Gipe, Upper Arlington, OH (US)

(73) Assignee: Impact Radius, Inc., Santa Barbara, CA (US)

( * ) Notice: Subject to any disclaimer, the term of this patent is extended or adjusted under 35 U.S.C. 154(b) by 573 days.

(21) Appl. No.: 15/360,189

(22) Filed: Nov. 23, 2016

(65) Prior Publication Data

US 2018/0144350 A1    May 24, 2018

(51) Int. Cl.
*G06Q 30/02* (2012.01)
*G06F 16/9535* (2019.01)

(52) U.S. Cl.
CPC ..... *G06Q 30/0201* (2013.01); *G06F 16/9535* (2019.01); *G06Q 30/0243* (2013.01)

(58) Field of Classification Search
CPC ............ G06Q 30/0201; G06Q 30/0243; G06F 16/9535
USPC ...................................................... 705/7.29
See application file for complete search history.

(56) References Cited

U.S. PATENT DOCUMENTS

| | | | |
|---|---|---|---|
| 7,496,892 B2 | 2/2009 | Nuss | |
| 7,861,222 B2 | 12/2010 | Ramsey et al. | |
| 7,890,928 B2 | 2/2011 | Patrudu | |
| 8,122,431 B2 | 2/2012 | De Becdelievre et al. | |
| 8,635,594 B1 | 1/2014 | Krishnan et al. | |
| 8,832,655 B2 | 9/2014 | Grechanik | |
| 9,443,252 B2* | 9/2016 | Chang | G06Q 30/0255 |
| 10,127,574 B2* | 11/2018 | Brown | G06Q 30/0246 |
| 10,290,039 B2* | 5/2019 | Hueter | G06Q 10/00 |
| 2012/0259854 A1* | 10/2012 | Hsiao | G06F 16/958 707/739 |
| 2014/0081740 A1* | 3/2014 | Lipka | G06Q 30/02 705/14.42 |
| 2014/0379490 A1* | 12/2014 | Schnabl | G06Q 30/0244 705/14.71 |
| 2017/0148048 A1* | 5/2017 | Cook | G06Q 30/0243 |
| 2018/0096417 A1* | 4/2018 | Cook | G06Q 30/0243 |
| 2018/0143975 A1* | 5/2018 | Casal | G06F 17/2785 |

FOREIGN PATENT DOCUMENTS

WO    WO-2015079318 A2 *    6/2015    ........ G06Q 30/0201

* cited by examiner

*Primary Examiner* — Dylan C White
(74) *Attorney, Agent, or Firm* — SoCal IP Law Group LLP; Steven C. Sereboff

(57) ABSTRACT

There are disclosed marketing analytics apparatus and processes. There is a data store of interactions between a plurality of customers and one or more vendors over a plurality of channels. Pathing and attribution of these interactions may be obtained as marketing analytics. Pathing may be obtained in part with a match programming statement which identifies all of the paths in the data store matching criteria specified in the match programming statement. Pathing may be obtained in part with a split programming statement which splits all of the journeys in the data store into paths. After pathing, an attribution pathing statement may be used to attribute conversions to other events.

23 Claims, 4 Drawing Sheets

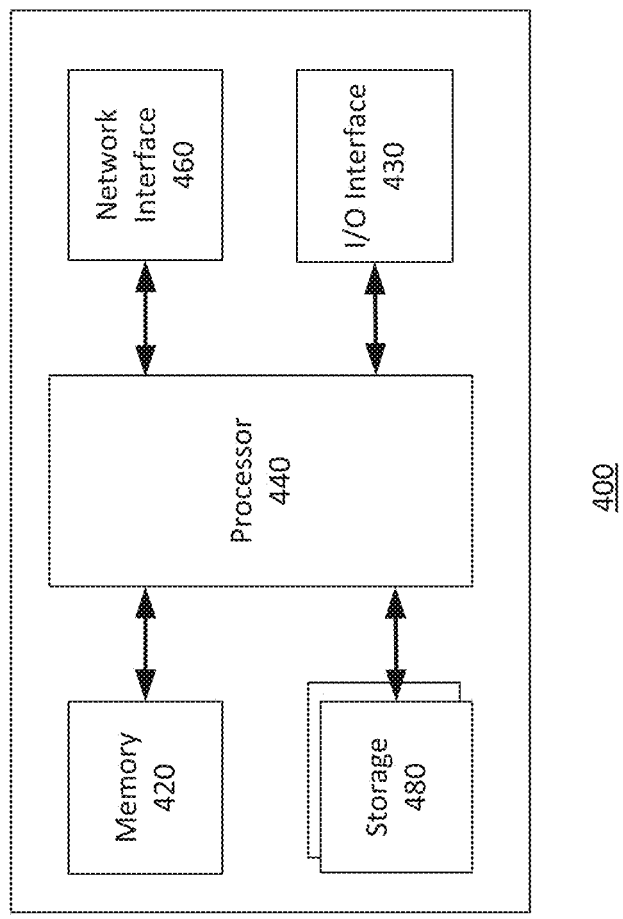

PATHING AND ATTRIBUTION IN MARKETING ANALYTICS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to marketing analytics.

Description of the Related Art

Marketing analytics is the practice of measuring, managing and analyzing marketing performance to maximize its effectiveness and optimize return on investment. Marketing analytics are used by vendors to assess performance of their marketing programs. The field includes the processes and technologies that enable vendors to evaluate their marketing initiatives. Marketing analytics uses software-based algorithms and statistics to derive meaning from data. Performance is typically assessed using business metrics such as return on investment (ROI), attribution and effectiveness. Marketing analytics can be used to obtain insights into customer preferences and trends, and assess sales and lead generation advertising campaigns.

Marketing analytics systems often aggregate data from across a variety of marketing channels and consolidate it into a common marketing view. From this common view, analytical results can be extracted to aid a vendor in making optimal marketing decisions.

Marketing data however, is often complex, sometimes unstructured, and can have multiple interrelated parts. This makes it difficult for structured query languages and tools to process. Furthermore, this data commonly has varying degrees of integrity (i.e., completeness, timeliness, and validity), and varying associated terminology. This arises from things like differences in marketing channels, marketing tactics, data gathering techniques, terminology and markets.

Data matching can be either deterministic or probabilistic. Deterministic matching mainly looks for an exact match between two pieces of data. It is fast and accurate if the data quality is perfect, clean and standard all of the time. In reality, data is collected in various source systems in many different ways. This is where probabilistic, or fuzzy, matching comes in. In probabilistic matching, several field values are compared between two records and each field is assigned a weight that indicates how closely the two field values match. The sum of the individual field weights indicates the likelihood of a match between two records.

Vendors have used marketing analytics for various metrics. Marketing analytics can be used to assess performance of marketing initiatives performing over selected time periods and how to improve them. Marketing analytics can be used to compare marketing activities of selected vendors. Marketing analytics can be used to determine how competitors are spending time and money on marketing, and the channels being used. Marketing analytics can be used to recommend improvements to a marketing plan, allocations between advertising campaigns, and prioritization of time and money.

DESCRIPTION OF THE DRAWINGS

FIG. 4 is a block diagram view of a computer workstation.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Figure 1:
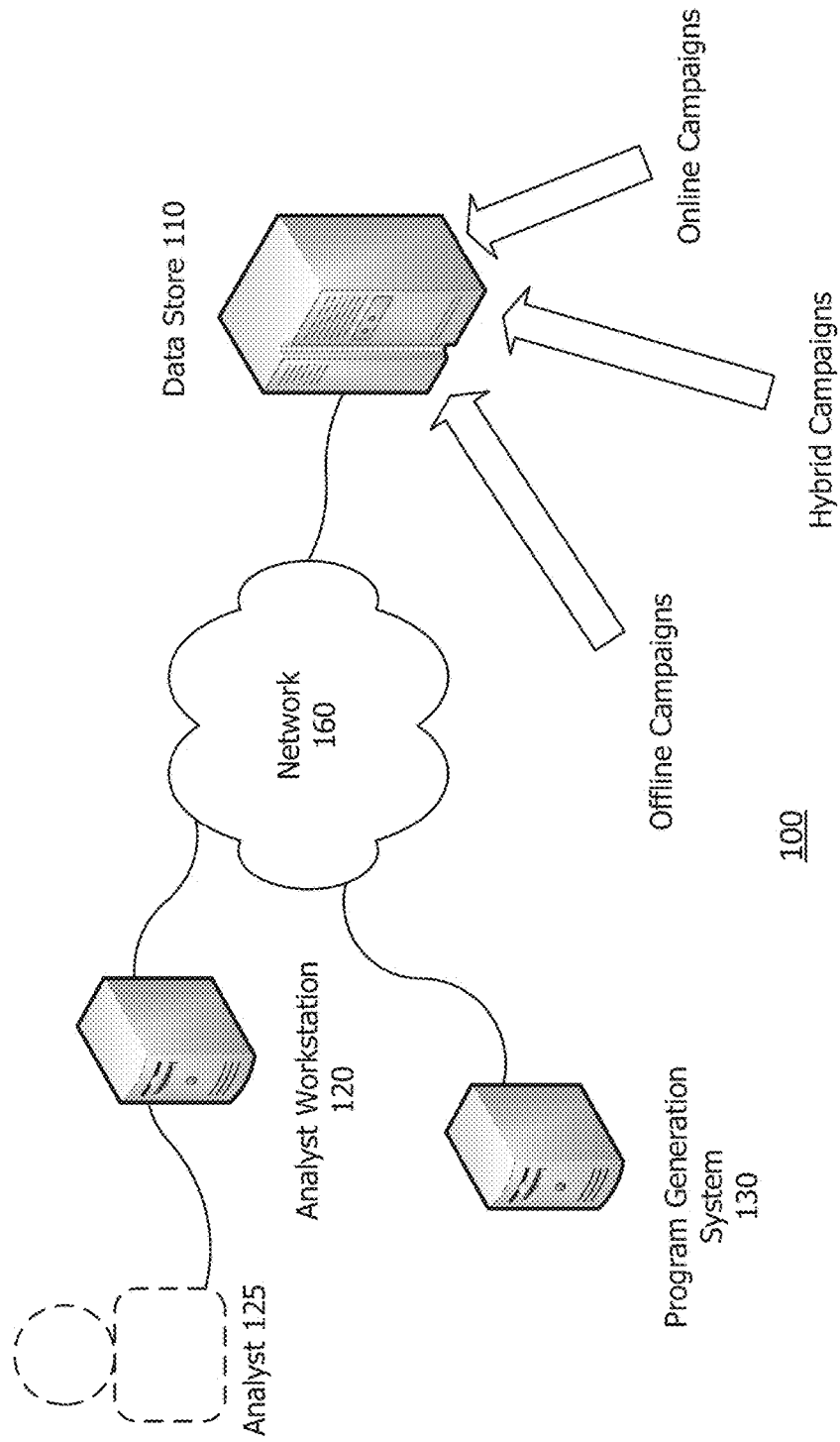
FIG. 1 is a block diagram of a system for pathing and attribution in marketing analytics.

Referring now to FIG. 1 there is shown a block diagram of a system 100 for pathing and attribution in marketing analytics. The system 100 includes a data store 110 connected to an analyst workstation 120, and in FIG. 1 connectivity is via a network 160.

The data store 110 is a data storage system and may be a single storage device, an array of devices, a distribution of devices and/or cloud storage, may be local or remote to the analyst workstation 120, and may be a combination of these. The data store 110 stores marketing data, including data and metadata of interactions between a plurality of customers and one or more vendors in the form of campaigns, journeys, paths and events. The data store 110 includes data and metadata about the campaigns, journeys, paths and events, as well as the customers and the vendors. The data store 110 may store both structured and unstructured data sets. The data store 110 may include and/or be managed using a combination of the Hadoop Distributed File System and HBase (NoSQL).

The analyst workstation 120 is used by an analyst 125 (i.e., a person) to query the data store 110. As explained further, the analyst creates a marketing analytics software program with a variety of programming statements adapted to the particular demands of marketing analysis and the data sets available. This program may be stored in a non-transitory medium in the analyst workstation 120 or elsewhere accessible to the analyst workstation 120. These programming statements, when executed by a processor, cause the processor to do things such as model, measure, manage and analyze marketing performance.

Glossary

The following terms have the specified meanings.

Attribution: a process of weighting an event with respect to a conversion.

Campaign: a series of related marketing activities intended to drive a particular outcome for a particular brand.

Channels: modalities of marketing interactions between vendors and targeted customers. Channels can include various forms of advertising such as banners, social media, blogs, videos, audio, and email.

Conversion: the point at which an activity or response by a customer to a call to action by a vendor fulfills the vendor's desired outcome, such as the customer making a purchase, registering for an event, subscribing to an e-newsletter, completing a lead-generation form, or downloading a file.

Customer: an individual, business or other real world party which can be the target of marketing and which can engage in purchasing transactions, include shoppers, users, prospective customers and buyers. Customers include prior and prospective purchasers from the vendor, and individuals and businesses that are actively engaged in shopping with the vendor.

Data visualization: a visual abstraction of data designed for the purpose of deriving meaning or communicating information more effectively.

Engagement rate: the length of time of a journey.

Event: an individual action at a point in time by a customer or a vendor. An event has at least an event type, a timestamp, and identification of the actor.

Funnel: all of a customer's events from the first interaction with the vendor to a conversion.

Journey: a sequence of related events by a customer defining an engagement of the customer with a campaign. A journey consists of at least one path.

Lead: a customer who has shown interest in a vendor, or its products or services.

Location data: data that describes a geographic location.

Path: a time-ordered series of events within a journey having time-based or position-based boundaries, and could be an entire journey.

Step: one or more events in a path to which conversion is attributed. If there is no conversion in a path then there are no steps.

Vendor: a real world entity that sells or distributes product or services to others, such as a business, non-profit or government agency.

Weight: an indicator of how closely two items match.

Figure 2:
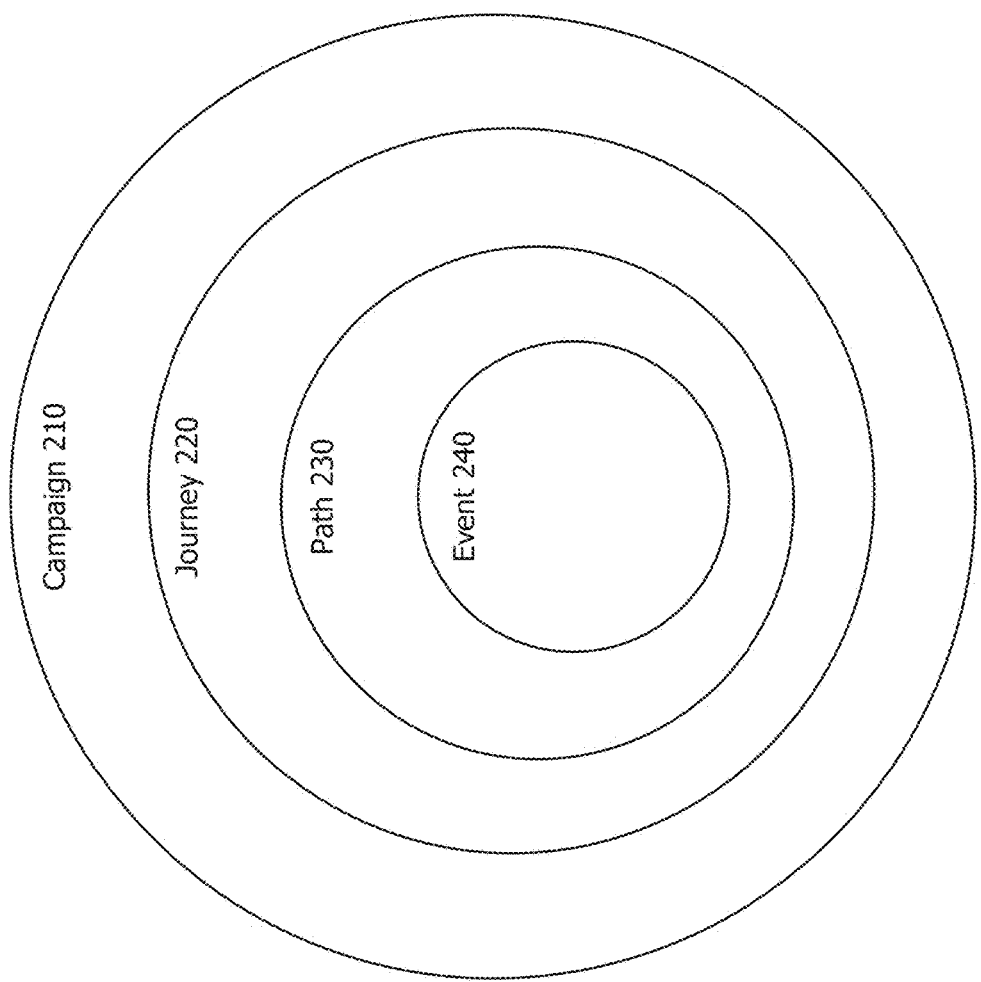
FIG. 2 is a Venn diagram of certain marketing data.

Referring now to FIG. 2 there is shown a Venn diagram of certain marketing data which may be stored in the data store 110. At the lowest level are events 240 and at the highest level are campaigns 210. Events 240 may be grouped into paths 230, and paths 230 may be grouped into journeys 220. This marketing data is referred to herein by its representative name. For example, data about a given campaign is referred to as the campaign; data about a given event is referred to as the event.

The data store 110 holds marketing event data and linked identifiers, such as a customer number to an email address or an online cookie to a vendor's CRM (customer relationship management) system identifier. Events are stored with relevant metadata, such as campaign, channel, and identifiers of the actor. The linked customer identifiers may be useful for tying together customer journeys cross-channel and cross-device.

Figure 3:
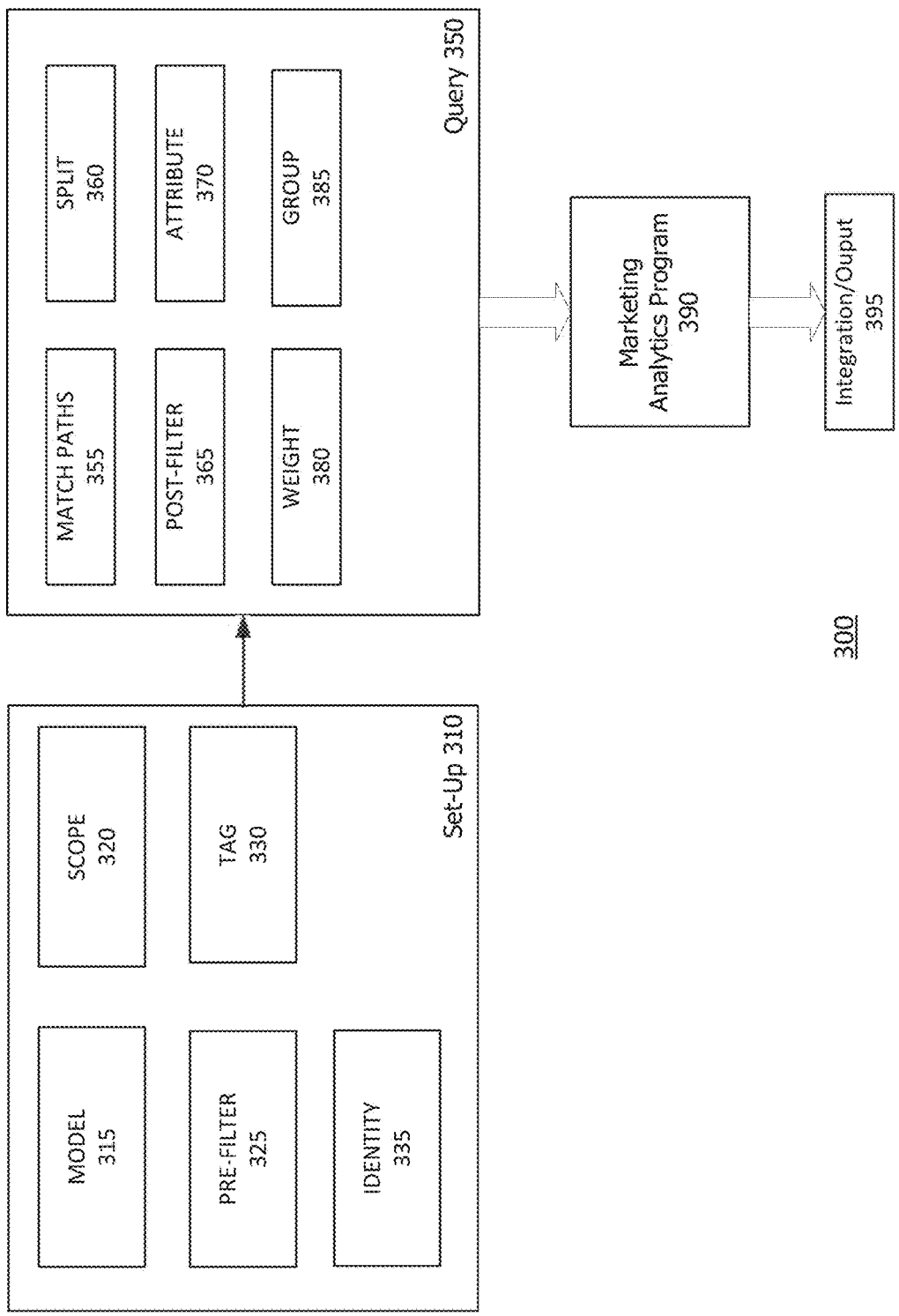
FIG. 3 is a flow chart of a process for pathing and attribution.

Referring now to FIG. 3 there is shown a block diagram chart of a process 300 for pathing and attribution. This process may be used by an analyst with the system 100 (FIG. 1). As shown in FIG. 3, the process 300 has two phases: a set-up phase 310 and a query phase 350, each with a number of components, and results in the creation of a marketing analytics program 390. Additional phases may be included.

The components of the phases are referred to by a name which also may be used as the name of a programming statement which provides the corresponding functionality. These programming statements are specially adapted for and therefore especially well-suited to the needs of marketing analytics. The term "programming statement" means the smallest standalone element of an imperative programming language that expresses some action to be carried out. It is an instruction written in a high-level language that commands the computer to perform a specified action.

Most of the programming statements are optional, and in general the marketing analytics program 390 may execute them in any order. The set-up phase 310 has components which include MODEL 315, SCOPE 320, PRE-FILTER 325, TAG 330 and IDENTITY 335. The set-up phase 310 and its components 315, 320, 325, 330, 335 are optional and may be obviated by system defaults.

Using the MODEL 315 programming statement the analyst may assign a name to a path model (described below) created by the marketing analytics program 390. The marketing analytics program 390 may use this name elsewhere, such as a prefix to any resulting output tables. The MODEL 315 programming statement may have a default value, such as a generic placeholder. If the MODEL 315 programming statement is omitted, a default form of the MODEL 315 programming statement may be included in the marketing analytics program 390, or one or more default values for names may be utilized.

Using the SCOPE 320 programming statement the analyst may limit a scope of all queries to campaigns matching specified criteria. The criteria may include one or more specific campaigns (e.g., through a numeric identifier or name), and/or timestamp ranges of campaigns. The timestamp ranges may take various forms, such as start/end of the campaign, or a range of when conversions occurred. The SCOPE 320 programming statement may take the form of SELECT CONTEXT.

Using the PRE-FILTER 325 programming statement the analyst may limit a query to events matching specified criteria. The criteria may include timestamp, event type, ad name, and metadata such as data location. The PRE-FILTER 325 programming statement may take the form of PRE-FILTER.

Using the TAG 330 programming statement the analyst may define labels for criteria clauses that can be used in subsequent grammar. That is, the TAG 330 programming statement assigns a specified tag to a plurality of events matching criteria specified in the TAG 330 programming statement. Tags specified in TAG 330 programming statements may then be used with other programming statements described herein.

Using the IDENTITY 335 programming statement the analyst may define identity matching rules used to join events into paths. The matching rules may be deterministic or probabilistic and have specific qualities and tolerances. If the IDENTITY 335 statement is omitted, a default form of the IDENTITY 335 programming statement may be included in the marketing analytics program 390, or default rules may be utilized. The matching rules specified in the IDENTITY 335 programming statement are used with other programming statements described herein where a "match" is performed.

The query phase 350 includes MATCH PATHS 355, SPLIT 360, POST-FILTER 365, ATTRIBUTE 370, WEIGHT 380, and GROUP 385.

Using the MATCH PATHS 355 programming statement the analyst may limit the query to paths matching specified criteria. The criteria specified in the MATCH PATHS 355 programming statement may take the form of a pattern of events. The patterns may be defined according to a predefined regular expression syntax. The MATCH PATHS 355 programming statement may use the tags. If the MATCH PATHS 355 programming statement is omitted, all paths may be included by default, or a default form of the MATCH PATHS 355 programming statement may be included in the marketing analytics program 390. A default matching pattern may be all paths.

Using the SPLIT 360 programming statement the analyst may cause journeys which match specified criteria to be separated (i.e., "split") into paths. As a result, the analyst may refine the paths selected by the MATCH PATHS 355 programming statement. The SPLIT 360 programming statement may use tags to identify which journeys to split.

Using the POST-FILTER 365 programming statement the analyst may further limit paths in the final result to those matching specified criteria. The criteria may include tags, length of the path (e.g., number of days), revenue generated from the customer in the path, shipping charged to the customer from a purchase in the path, taxes charged to the customer from a purchase in the path, discounts granted to the customer from a purchase in the path, number of steps in the path, number of events in the path, number of conversions in the path, number of clicks in the path, number of impressions in the path.

Using the ATTRIBUTE 370 programming statement the analyst may attribute as conversions those tagged events which match specified criteria. The criteria may employ a number of models, such as algorithmic, even, the first event in the path, the last event in the path, one or more positions within the path, a linear or exponential time decay (to reflect that a step may have less impact on a conversion as the time between the step and the conversion increases), and the inverse of linear or exponential time decay (to reflect that a step farther away from the conversion gets more credit). In the even model, the same credit is assigned to each event in the path. The specified criteria may include tags, and may utilize a generic ANY tag to match any events which are not a conversion. Other criteria may include a lookback window, which sets a maximum time period before the conversion for selection of events. If the ATTRIBUTE 370 programming statement is not expressed in the marketing analysis program, the marketing analytics program 390 will not do attribution and only run pathing. If the SCOPE 320 programming statement specifies a conversion timestamp range, the marketing analytics program 390 may cause the ATTRIBUTE 370 programming statement to automatically pull in related events.

Using the WEIGHT 380 programming statement the analyst may fine tune attribution by applying a weighting to events of certain tags in the path. In the WEIGHT programming statement the analyst causes a multiplier to be applied after the attribution model has been run to inflate (>1.0) or deflate (<1.0) particular tagged events. Weighting something by 0 is a way to exclude credit to tagged events.

Using the GROUP 385 programming statement the analyst may cause a group of consecutive events to be treated as one shared step for attributing value. In the GROUP 385 programming statement the analyst may specify a time period for the events in the group from the step along with the TAG to group.

As explained, many of the programming statements utilize specified criteria. The criteria may employ various functions, such as Boolean (e.g., AND, OR, NOT), wildcards, algorithmic (e.g., plus, minus), time (e.g., specific timestamp, timestamp range, BEFORE, AFTER, WITHIN) and relativistic functions (e.g., BIGGER, LESSER, LIKE, IN). The functions may leverage the structure of the data store, such as by specifying a file within the data store. The output of functions may be binary (e.g., true/false), numeric or otherwise, depending on the nature of the function and its desired use.

The marketing analytics program 390 may be used on its own or within or in conjunction with various active and/or passive decision-making systems 395. For example, the marketing analytics program 390 may output pathing and attribution tables. These outputs may be useful to the analyst to refine the marketing analysis program, such as its programming statements and criteria. The path tables may include event data from the matched paths, the number of steps in the matched path, and the duration of the matched paths. The attribution tables may include credited event level, position, and weighted amounts. Using an INCLUDE FIELDS programming statement the analyst may specify fields to include in the output tables.

Referring again to FIG. 1, the system 100 may include a program generation system 130. The marketing analytics program may be created in whole or in part by an analyst through the program generation system 130. Through a user interface of the program generation system 130, the analyst may select program statements for inclusion in the marketing analytics program, and the criteria for those program statements. The program generation system 130 automatically generates the marketing analytics program having the corresponding program statements and criteria. The program generation system 130 includes hardware and software for providing this functionality. The hardware may be shared with other components of the system 100 in whole or in part. The software may be on one or more of a single computer, a group of computers or a cloud.

The marketing analytics program, whether created manually or automatically, may be in the form of a standalone program or a logical set of routines. Because the programming statements described above are high level, they may be subsequently compiled into object code or executables, or interpreted at run time.

Referring now to FIG. 4, there is shown a block diagram of a computer workstation 400 which may be used as the analyst workstation 120 or the program generation system 130 (FIG. 1). The workstation 400 has a an input/output interface 430 which interfaces to a user input device (now shown) and a display device (now shown); a processor 440; a memory 420; a network interface 460 and storage 480. The marketing analytics program may be created and/or controlled by an analyst through the I/O interface 430, and stored in the storage 480. The processor 440 and the memory 420 have circuits and software for performing programming statements such as those in the marketing analytics program.

The workstation 400 may include software and/or hardware for providing functionality and features described herein. A workstation may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the workstation may include various specialized units, circuits, software and interfaces for providing the functionality and features described here. The processes, functionality and features may be embodied in whole or in part in software which operates on the workstation and may be in the form of firmware, an application program, an applet (e.g., a Java applet), a browser plug-in, a dynamic linked library (DLL), a script or one or more subroutines. The hardware and software and their functions may be distributed such that some components are performed by a workstation and others by other devices.

The techniques may be implemented with machine readable storage media in a storage device included with or otherwise coupled or attached to a computing device. That is, the software may be stored in electronic, machine readable media. These storage media include, for example, magnetic media such as hard disks, optical media; solid state storage such as flash memory systems; and other storage media. As used herein, a storage device is a device that allows for reading and/or writing to a storage medium.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A transaction analytics apparatus using a data store of electronic transactions between a plurality of first entities and one or more second entities over a plurality of electronic channels, each electronic transaction being defined by one or more distinct events, the data store including transaction data which defines campaigns, journeys, paths and events, and entity data which defines the first entities and the second entities; the apparatus comprising:
   a storage medium storing a transaction analytics program for providing insights into customer preferences and trends, and assessing sales and lead generation advertising campaigns by assessing performance of marketing programs in terms of assessed return on investment (ROI), attribution and effectiveness, and for evaluating marketing initiatives, the transaction analytics program having non-transitory programming statements which when executed by a processor will cause the processor to analyze transaction data, the programming statements of the transaction analytics program including at least one of:
   a match programming statement which identifies all of the paths in the data store matching criteria specified in the match programming statement; and
   a split programming statement splitting all of the journeys in the data store into paths;
   the programming statements further including:
   a weight programming statement applying a weighting to events of certain tags in the path, the weighting comprising a multiplier to be applied after an attribution model has been run to inflate or deflate particular tagged events, and
   a post-filter programming statement limiting paths in the final result to those matching specified criteria;
   wherein each event comprises one action at a point in time by a given one of the first entities or second entities, wherein the event includes at least an event type, a timestamp, and identification of the given one of the first entities or second entities;
   wherein each path consists essentially of a time-ordered series of events within one journey having time-based or position-based boundaries; and
   wherein each journey consists essentially of a sequence of related events by a one of the first entities defining an engagement of the one of the first entities with a one of the second entities across the electronic channels.

2. The apparatus of claim 1 further comprising a user input device; a display device; a processor; a memory; wherein the processor and the memory comprise circuits and software for performing the programming statements.

3. The apparatus of claim 1, the transaction analytics program further comprising a tag programming statement to assign a specified tag to a plurality of events matching criteria specified in the tag programming statement.

4. The apparatus of claim 3, the transaction analytics program further comprising an attribute programming statement attributing tagged events matching criteria specified in the attribute programming statement as conversions.

5. The apparatus of claim 4 wherein the criteria include all tagged events.

6. The apparatus of claim 1, the marketing analytics program further comprising a scope programming statement to limit a scope of all queries to campaigns matching criteria specified in the scope programming statement.

7. The apparatus of claim 6 wherein the specified criteria in the scope programming statement is at least one of a specific campaign or one or more campaign timestamp ranges.

8. The apparatus of claim 1, the transaction analytics program further comprising an identity programming statement which defines how to match data by specifying identity matching rules.

9. The apparatus of claim 1 wherein at least some events include attribution credit.

10. The apparatus of claim 1 wherein at least one journey consists of one path.

11. The transaction analytics apparatus of claim 1 wherein if the weighting is greater than 1.0 then the particular tagged events are inflated, and if the weighting is less than 1.0 then the particular tagged events are deflated.

12. The transaction analytics apparatus of claim 1 wherein if the weighting is 0 then the particular tagged events are excluded.

13. The transaction analytics apparatus of claim 1 wherein the post-filter programming statement includes criteria including at least one of tags, length of the path, revenue generated from the customer in the path, shipping charged to the customer from a purchase in the path, taxes charged to the customer from a purchase in the path, discounts granted to the customer from a purchase in the path, number of steps in the path, number of events in the path, number of conversions in the path, number of clicks in the path, and number of impressions in the path.

14. A process for pathing and attribution using a data store of electronic transactions between a plurality of first entities and one or more second entities over a plurality of electronic channels to analyze electronic transactions to provide insights into customer preferences and trends, and assessing sales and lead generation advertising campaigns by assessing performance of marketing programs in terms of assessed return on investment (ROI), attribution and effectiveness, and for evaluating marketing initiative, each electronic transaction being defined by one or more distinct events, the data store including transaction data which defines campaigns, journeys, paths and events, and entity data which defines the first entities and the second entities; the process comprising:

a set-up phase;
a query phase including at least one of:
processing a match programming statement which identifies all of the paths in the data store matching criteria specified in the match programming statement; and
processing a split programming statement splitting all of the journeys in the data store into paths;
the query phase further including:
processing a weight programming statement applying a weighting to events of certain tags in the path, the weighting comprising a multiplier to be applied after an attribution model has been run to inflate or deflate particular tagged events, and
processing a post-filter programming statement limiting paths in the final result to those matching specified criteria;
wherein each event comprises one action at a point in time by a given one of the first entities or second entities, wherein the event includes at least an event type, a timestamp, and identification of the given one of the first entities or second entities;
wherein each path consists essentially of a time-ordered series of events within one journey having time-based or position-based boundaries; and
wherein each journey consists essentially of a sequence of related events by a one of the first entities defining an engagement of the one of the first entities with a one of the second entities across the electronic channels.

15. The process for pathing and attribution of claim 14, further comprising processing a tag programming statement to assign a specified tag to a plurality of events matching criteria specified in the tag programming statement.

16. The process for pathing and attribution of claim 15 further comprising processing an attribute programming statement attributing tagged events matching criteria specified in the attribute programing statement as conversions.

17. The process for pathing and attribution of claim 14 further comprising processing a scope programming statement to limit a scope of all queries to campaigns matching criteria specified in the scope programming statement.

18. The process for pathing and attribution of claim 17 wherein the specified criteria in the scope programming statement is at least one of a specific campaign or one or more campaign timestamp ranges.

19. The process for pathing and attribution of claim 14 further comprising processing an identity programming statement which defines how to match data by specifying identity matching rules.

20. The process for pathing and attribution of claim 19 wherein the matching rules are either deterministic or probabilistic and have specific qualities and tolerances.

21. The process for pathing and attribution of claim 19 further comprising default matching rules which are utilized unless manually overridden with an identity programming statement.

22. The process for pathing and attribution of claim 14 wherein at least some events include attribution credit.

23. The process for pathing and attribution of claim 14 wherein at least one journey consists of one path.

* * * * *